(12) United States Patent
Zhu et al.

(10) Patent No.: US 11,916,250 B2
(45) Date of Patent: Feb. 27, 2024

(54) BATTERY PACK INCLUDING VENT GAS PASSAGEWAY

(71) Applicant: Ford Global Technologies, LLC, Dearborn, MI (US)

(72) Inventors: Di Zhu, Canton, MI (US); June Ren, Nanjing (CN); Yafeng Wang, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 17/541,356

(22) Filed: Dec. 3, 2021

(65) Prior Publication Data

US 2022/0223972 A1 Jul. 14, 2022

(30) Foreign Application Priority Data

Jan. 13, 2021 (CN) .......................... 202110044949.1

(51) Int. Cl.
*H01M 50/367* (2021.01)
*H01M 50/249* (2021.01)
*B60L 58/26* (2019.01)
*H01M 50/204* (2021.01)

(52) U.S. Cl.
CPC ........... *H01M 50/367* (2021.01); *B60L 58/26* (2019.02); *H01M 50/204* (2021.01); *H01M 50/249* (2021.01); *H01M 2220/20* (2013.01)

(58) Field of Classification Search
CPC ....... H01M 50/209; H01M 50/30–375; H01M 50/367; H01M 50/249; H01M 50/204; B60L 58/26
See application file for complete search history.

(56) References Cited

U.S. PATENT DOCUMENTS

| 9,614,208 B2 | 4/2017 | Lee |
| 9,685,645 B2 | 6/2017 | Janarthanam et al. |
| 10,312,490 B2 | 6/2019 | Maguire |

(Continued)

FOREIGN PATENT DOCUMENTS

| EP | 4068443 A1 * 10/2022 | .......... H01M 50/171 |
| WO | WO-2017181283 A1 * 10/2017 | ........... B23H 11/003 |

(Continued)

OTHER PUBLICATIONS

Edwards. "Vacuum pump and vacuum systems—safety manual". 2008.

(Continued)

*Primary Examiner* — Milton I Cano
*Assistant Examiner* — Albert Michael Hilton
(74) *Attorney, Agent, or Firm* — David B. Kelley; Carlson, Gaskey & Olds, P.C.

(57) ABSTRACT

This disclosure relates to a battery assembly of an electrified vehicle, and in particular to a battery pack with a vent gas passageway. An example battery assembly includes a battery array having a plurality of battery cells. Each of the battery cells includes a vent configured to release vent gas from a respective one of the battery cells. Further, the battery assembly includes an enclosure assembly surrounding the battery array, and a vent gas passageway within the enclosure assembly. The vent gas passageway includes a plurality of inlet ports, and each of the inlet ports is substantially aligned with a respective one of the vents.

19 Claims, 6 Drawing Sheets

(56) References Cited

U.S. PATENT DOCUMENTS

| | | |
|---|---|---|
| 10,707,464 B2 | 7/2020 | Freiman et al. |
| 2010/0025132 A1* | 2/2010 | Hill ........................ B62D 29/02 |
| | | 180/68.5 |
| 2012/0164490 A1 | 6/2012 | Itoi et al. |
| 2013/0095356 A1* | 4/2013 | Shimizu .............. H01M 50/519 |
| | | 429/88 |
| 2016/0197322 A1* | 7/2016 | Tyler ................... H01M 50/528 |
| | | 429/89 |
| 2020/0256921 A1 | 8/2020 | Hwang et al. |
| 2021/0265700 A1* | 8/2021 | Egashira ............. H01M 50/204 |

FOREIGN PATENT DOCUMENTS

| | | | | |
|---|---|---|---|---|
| WO | WO-2020003800 A1 * | 1/2020 | .......... H01M 50/147 |
| WO | 2020194965 A1 | 10/2020 | |

OTHER PUBLICATIONS

Gas cylinders—Gases and gas mixtures—Determination of fire potential and oxidizing ability for the selection of cylinder valve outlets. ISO. (n.d.). Retrieved Dec. 3, 2021, from https://www.iso.org/obp/ui/#iso:std:iso:10156:ed-4:v1:en.

Britton et al. (Sep. 21, 2012). CDC—mining—the role of ASTM E27 methods in Hazard assessment: Part ii—!!—NIOSH. Centers for Disease Control and Prevention. Retrieved Dec. 3, 2021, from https://www.cdc.gov/niosh/mining/works/coversheet1755.html.

Torr, Stuart M. Komex. "Innovative Multiphase Extraction Design Operating above the Upper Flammability Limit (UFL)." Oct. 2005.

* cited by examiner

BATTERY PACK INCLUDING VENT GAS PASSAGEWAY

TECHNICAL FIELD

This disclosure relates to a battery assembly of an electrified vehicle, and in particular to a battery pack with a vent gas passageway.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells and various other battery internal components that support electric propulsion of electrified vehicles.

SUMMARY

A battery assembly for an electrified vehicle according to an exemplary aspect of the present disclosure incudes, among other things, a battery array having a plurality of battery cells. Each of the battery cells includes a vent configured to release vent gas from a respective one of the battery cells. Further, the battery assembly includes an enclosure assembly surrounding the battery array, and a vent gas passageway within the enclosure assembly. The vent gas passageway includes a plurality of inlet ports, and each of the inlet ports is substantially aligned with a respective one of the vents.

In a further non-limiting embodiment of the foregoing battery assembly, the inlet ports are provided by frangible sections of a structure.

In a further non-limiting embodiment of any of the foregoing battery assemblies, the vent gas passageway is bound within a plate assembly arranged above the battery cells.

In a further non-limiting embodiment of any of the foregoing battery assemblies, the plate assembly includes a first plate and a second plate, the second plate is arranged between the first plate and the vents, and the vent gas passageway is at least partially bound by the first and second plates.

In a further non-limiting embodiment of any of the foregoing battery assemblies, the inlet ports are provided by the second plate.

In a further non-limiting embodiment of any of the foregoing battery assemblies, the second plate includes a plurality of frangible sections, and each frangible section provides one of the inlet ports.

In a further non-limiting embodiment of any of the foregoing battery assemblies, the second plate includes a plurality of notches providing each frangible section.

In a further non-limiting embodiment of any of the foregoing battery assemblies, each frangible section is configured to at least partially separate from a remainder of the second plate in response to a thermal event.

In a further non-limiting embodiment of any of the foregoing battery assemblies, the vents of the battery cells are adjacent an upper surface of the battery cells, and the second plate is spaced-apart above the upper surfaces of the battery cells.

In a further non-limiting embodiment of any of the foregoing battery assemblies, the vent gas passageways provides a circuitous passageway between the inlet ports and an outlet port of the vent gas passageway.

In a further non-limiting embodiment of any of the foregoing battery assemblies, the vent gas passageway includes a first section and a second section, and the vent gas passageway is configured such that vent gas entering the vent gas passageway from one or more of the inlet ports flows into either the first section or the second section.

In a further non-limiting embodiment of any of the foregoing battery assemblies, a central divider within the vent gas passageway and adjacent the inlet ports directs vent gas entering the vent gas passageway from one or more of the inlet ports into one of the first and second sections.

In a further non-limiting embodiment of any of the foregoing battery assemblies, the first and second sections are each configured as a serpentine flow channel.

In a further non-limiting embodiment of any of the foregoing battery assemblies, the first and second sections are defined by projections between the first plate and the second plate.

In a further non-limiting embodiment of any of the foregoing battery assemblies, the vents of the battery cells are configured to release the vent gas in a thermal event.

An electrified vehicle according to an exemplary aspect of the present disclosure includes, among other things, an electric machine configured to propel the electrified vehicle and a battery assembly configured to deliver power to the electric machine. The battery assembly includes a battery array having a plurality of battery cells. Each of the battery cells includes a vent configured to release vent gases from a respective one of the battery cells. The battery assembly further includes an enclosure assembly surrounding the battery array. Further, the battery assembly includes a vent gas passageway within the enclosure assembly. The vent gas passageway includes plurality of inlet ports, and each of the inlet ports is substantially aligned with a respective one of the vents.

In a further non-limiting embodiment of the foregoing electrified vehicle, the vent gas passageway is at least partially bound within a plate assembly arranged above the battery cells, the plate assembly includes a first plate and a second plate, and the second plate is arranged between the first plate and the vents.

In a further non-limiting embodiment of any of the foregoing electrified vehicles, the second plate includes a plurality of frangible sections, each frangible section provides one of the inlet ports, and each frangible section is configured to at least partially separate from a remainder of the second plate in response to a thermal event.

In a further non-limiting embodiment of any of the foregoing electrified vehicles, the vent gas passageway provides a circuitous passageway between the inlet ports and an outlet port of the vent gas passageway.

In a further non-limiting embodiment of any of the foregoing electrified vehicles, the circuitous passageway includes two serpentine flow channels.

DETAILED DESCRIPTION

This disclosure relates to a battery assembly of an electrified vehicle, and in particular to a battery pack with a vent gas passageway. An example battery assembly includes a battery array having a plurality of battery cells. Each of the battery cells includes a vent configured to release vent gas from a respective one of the battery cells. Further, the battery assembly includes an enclosure assembly surrounding the battery array, and a vent gas passageway within the enclosure assembly. The vent gas passageway includes a plurality of inlet ports, and each of the inlet ports is substantially aligned with a respective one of the vents. Among other benefits, which will be appreciated from the below description, the disclosed arrangement mitigates thermal events, protects the enclosure of the battery assembly, and reduces if not eliminates any discharge of debris, particles, and/or liquid droplets that may be suspended in vent gases.

Figure 1:
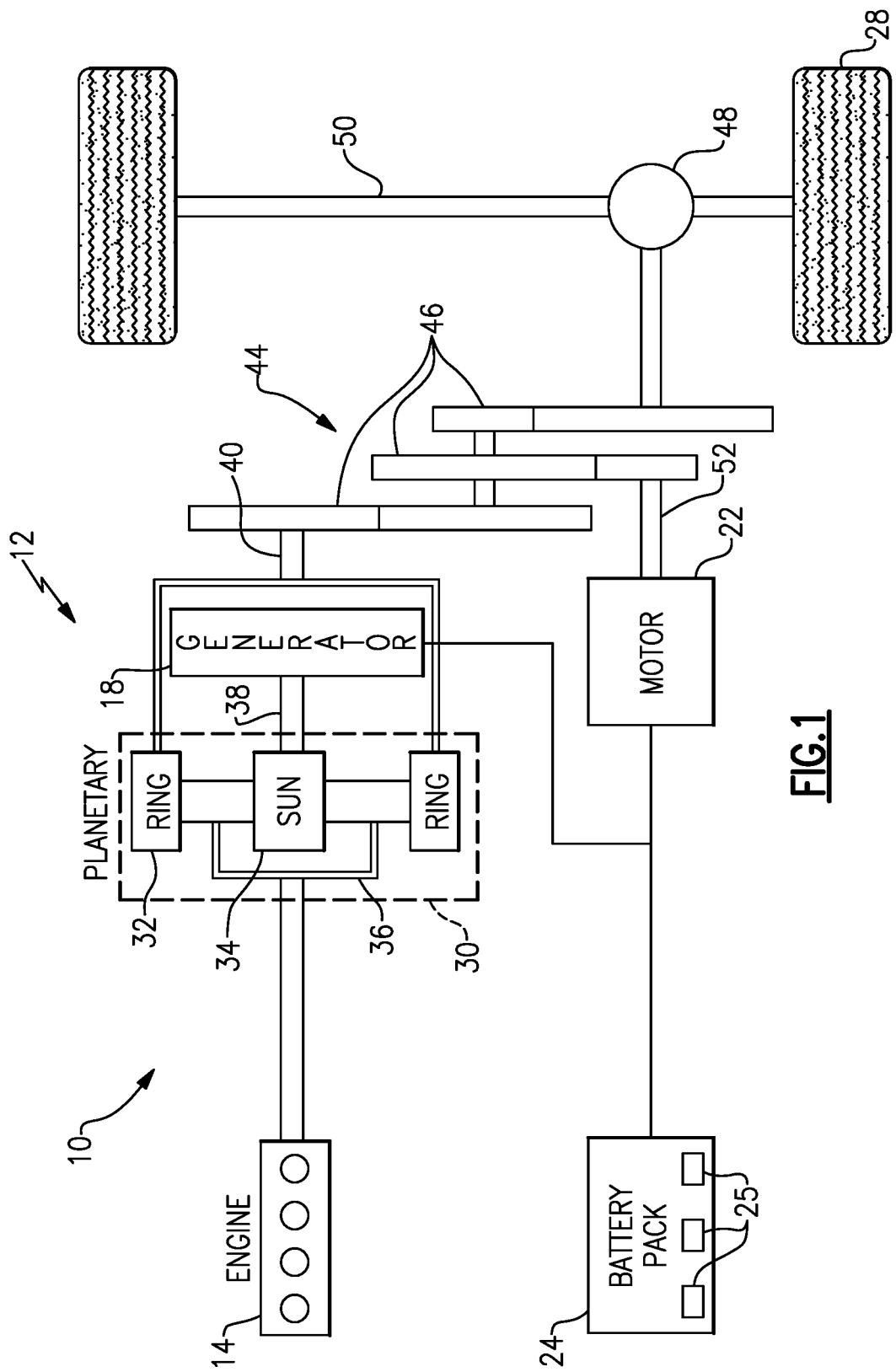
FIG. 1 schematically illustrates an example powertrain of an electrified vehicle.

FIG. 1 schematically illustrates a powertrain 10 for an electrified vehicle 12 ("vehicle 12"). Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery arrays 25, or other groupings of battery cells, capable of outputting electrical power to operate the motor 22, the generator 18, and/or other electrical loads of the vehicle 12.

Figure 2:
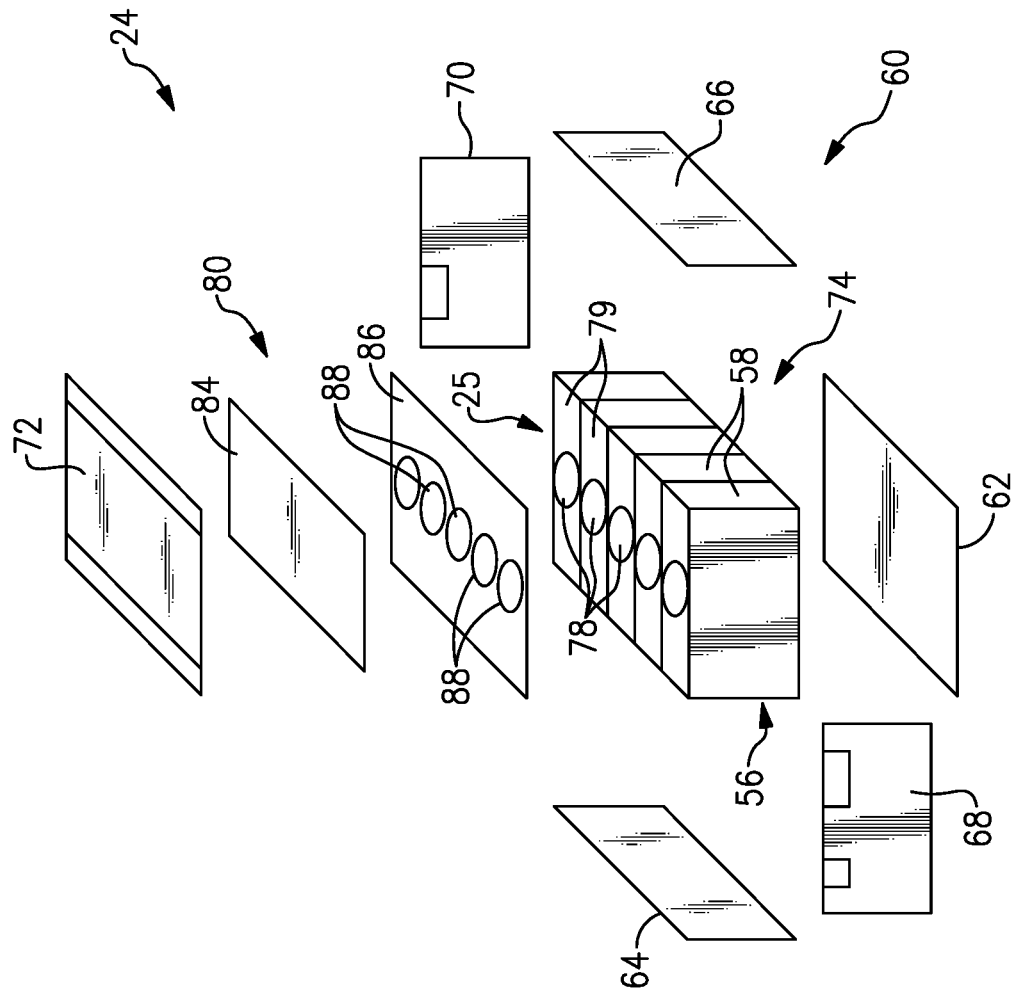
FIG. 2 is a perspective, exploded view of an example battery assembly.

An example battery array 25 is shown in FIG. 2, and includes a single battery array with a plurality of battery cells. This disclosure is not limited to battery packs with one battery array and extends to battery packs with one or more battery arrays. Other types of energy storage devices and/or output devices can also be used to electrically power the vehicle 12.

In one non-limiting embodiment, the vehicle 12 has two basic operating modes. The vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The vehicle 12 may additionally operate in a Hybrid (HEV) mode in which the engine 14 and the motor 22 are both used for vehicle propulsion. The HEV mode is an example of a charge sustaining mode of operation for the vehicle 12. During the HEV mode, the vehicle 12 may reduce the motor 22 propulsion usage in order to maintain the state of charge of the battery assembly 24 at a constant or approximately constant level by increasing the engine 14 propulsion usage. The vehicle 12 may be operated in other operating modes in addition to the EV and HEV modes within the scope of this disclosure.

Figure 3:
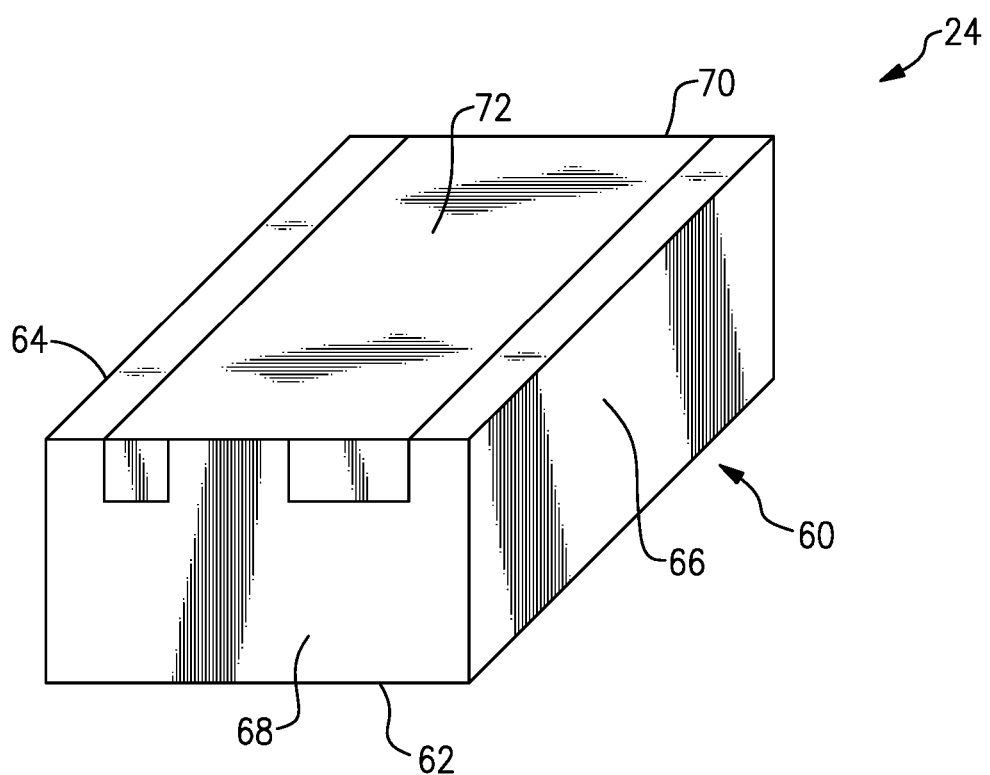
FIG. 3 is a perspective, assembled view of the example battery assembly.

FIG. 2 illustrates additional detail of the battery assembly 24 in an exploded view. FIG. 3 illustrates the same battery assembly 24 in an assembled state. With joint reference to FIGS. 2 and 3, the battery assembly 24 includes one battery array 56 configured to supply electrical power to various vehicle components. The battery assembly 24 could include additional battery arrays, however.

The battery array 56 includes a plurality of battery cells 58 that are stacked side-by-side along a span length (i.e., the largest dimension) of the battery array 56. Although not shown in the schematic depiction of FIG. 2, the battery cells 58 may be electrically connected to one another using busbar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

An enclosure assembly 60 surrounds the battery array 56. The enclosure assembly 60 includes a bottom wall 62, left and right side walls 64, 66, end walls 68, 70, and a top wall 72. The enclosure assembly 60 surrounds an interior 74 (i.e., area inside the walls 62, 64, 66, 68, 70, 72) of the enclosure assembly 60, which houses the battery array 56 and any other components of the battery assembly 24. The enclosure assembly 60 may take any size, shape or configuration, and is not limited to the specific configuration of FIG. 2. Further, the adjacent parts of the enclosure assembly 60 are connected together. In order to provide an air and water-tight seal, one or more gaskets and/or seals may fill the space at an interface between the mating surfaces of the parts of the enclosure assembly 60.

During operation of the electrified vehicle 12, the battery cells 58 and internal components of the battery assembly 24 can experience a rare event known as thermal runaway during certain battery thermal events (e.g., overcharging, overheating, etc.). Further, in such conditions, the battery cells 58 may vent gases into the interior 74 of the enclosure assembly 60. The vent gases may be caused by an applied force or a thermal event, and can either cause or exacerbate an existing thermal event. The vent gases expelled by the battery cells 58 may include a gaseous byproduct including gas and debris, such as relatively small, solid particles and/or liquid droplets suspended in the gas. In this disclosure, reference to "gas" or "vent gas" is inclusive of any debris, particles, and/or droplets suspended in that gas, unless specifically indicated.

Figure 4:
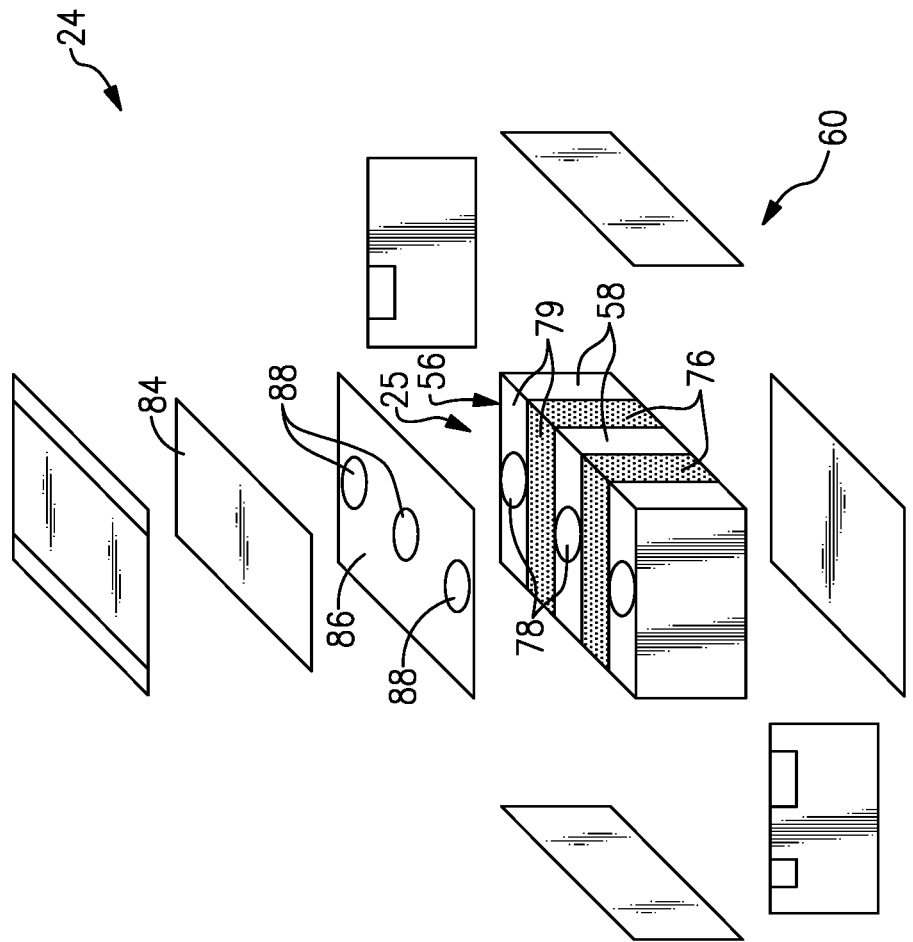
FIG. 4 is a perspective, exploded view of another example battery assembly including separators between adjacent battery cells.

In FIG. 2, adjacent battery cells 58 directly contact one another. This disclosure extends to other arrangements, such as in FIG. 4, in which there is a separator 76 between each adjacent battery cell 58. The separators 76 may be made of thermally insulated material such as aerogel or mica. The quantities of battery cells 58 and separators 76 in FIGS. 2 and 4 are exemplary.

In both examples, the battery cells 58 each include a vent port 78 ("vent 78") adjacent an upper surface 79 of the battery cell 58. The vents 78 are configured to release vent gases from the interior of the battery cells 58 when the battery cells 58 become relatively hot and/or experience an increase in pressure, such as during a thermal event. The vents 78 are configured to open when an internal pressure of the battery cell 58 exceeds a threshold, which is 400 kPa in one example.

Figure 5:
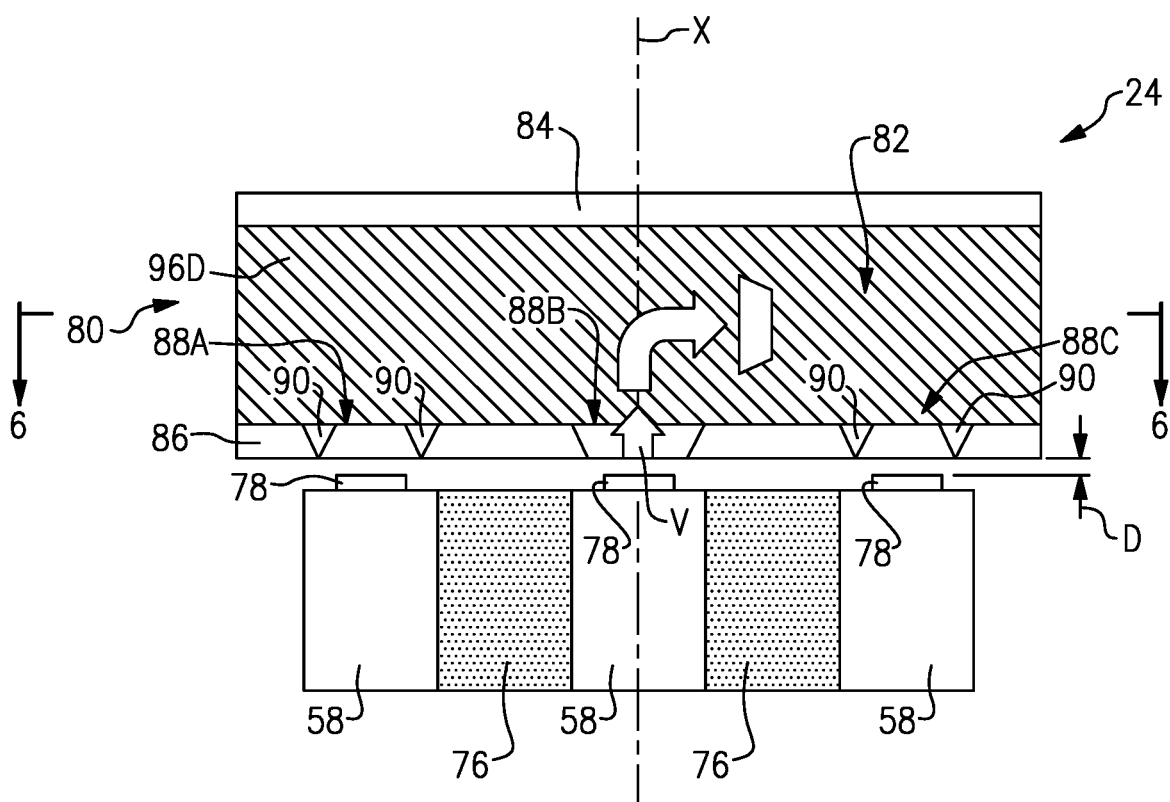
FIG. 5 is a sectional, side view of a portion of the battery assembly of FIG. 4 taken along line 5-5 from FIG. 6.

In this disclosure, the battery assembly 24 further includes a plate assembly 80 which is arranged in the enclosure assembly 60 and at least partially defines a vent gas passageway 82, as generally shown in FIG. 5. The plate assembly 80 includes a first plate 84 and second plate 86. The first plate 84 is a top plate and is arranged adjacent the top wall 72. In a particular example, the first plate 84 is directly attached to the top wall 72. The second plate 86 is spaced-apart from the first plate 84 in a direction toward the bottom wall 62 such that a vertical space exists between the first and second plates 84, 86, which provides the vent gas passageway 82. In particular, a majority of the first plate 84 lies in a plane that is spaced-apart vertically from a plane containing a majority of the second plate 86. When the first plate 84 includes projections, as discussed below relative to FIG. 6, the second plate 86 may contact those projections. Still, the main portions of the first and second plates 84, 86, namely everything but the projections, are spaced-apart from one another to provide the vent gas passageway 82.

In an example of this disclosure, the first and second plates 84, 86 are made of a material with a relatively low thermal conductivity, a relatively low breakdown voltage, a relatively high flexural modulus, and a relatively high tensile strength. In a particular example, the first and second plates 84, 86 are made of a material that exhibits a thermal conductivity less than 0.3 W/m*K (Watts per meter-Kelvin), a breakdown voltage less than 20 kV, a flexural modulus of 120 MPa, and a tensile strength of 1800 MPa. Example materials for the first and second plates 84, 86 include mica and fiber glass. The materials of the first and second plates 84, 86 may also be both electrically and thermally insulated.

The vertical space between the first and second plates 84, 86 is set such that vent gases can flow through the vent gas passageway 82 while also starving the vent gases of oxygen within the vent gas passageway 82, which serves to prevent furtherance of a thermal event. Adjusting the vertical space between the first and second plates 84, 86 changes the volume of the vent gas passageway 82. The precise vertical space between the first and second plates 84, 86 is set during a manufacturing process based on a chemistry of the battery cells 58, and in turn an expected chemistry of the vent gases. Further, the arrangement of walls 62, 64, 66, 68, 70, 72 is also set such that the volume of the interior 74 prevents the furtherance of a thermal event, based on the expected chemistry of the vent gases. Other factors may be considered when setting the vertical space between the first and second plates 84, 86 and the size of the interior 74. Such factors include the characteristics of the cell chemistry relative to high heats and pressures, the altitude at which the electrified vehicle 12 is most likely to be used, the nitrogen concentration in air, the expected nitrogen concentration in a particular location within the battery assembly 24 after or during a thermal event, etc.

Fluid, namely vent gas, is configured to flow along the vent gas passageway 82 from an inlet to an outlet. In this example, the vent gas passageway 82 includes a plurality of inlets and a plurality of outlets. The vent gas passageway 82 is vertically bound by the first and second plates 84, 86, and is bound at the ends and on the sides by walls 64, 66, 68, 70, in this example.

In this disclosure, the inlets to the vent gas passageway 82 are provided by inlet ports 88 formed in the second plate 86. In FIG. 5, three inlet ports 88A-88C are shown. The inlet ports 88A-88C are frangible sections of the second plate 86 vertically aligned with the vents 78. The frangible sections are formed by providing notches 90 in the second plate. While notches are mentioned as a technique for forming the frangible sections, the frangible sections could be formed in another manner. In normal operating conditions, the frangible sections may be relatively indistinguishable from a remainder of the second plate 86. However, the frangible sections are intentionally weakened such that they will at least partially separate from the remainder of the second plate 86 in response to relatively high pressures, such as those associated with vent gases released from the vents 78 in a thermal event. In an example, the frangible sections are configured to at least partially separate when exposed to pressures of 400 kPa or greater.

Regarding the vertical alignment of the inlet ports 88 relative to the vents 78, with reference to the inlet port 88B and the corresponding vent 78, a vertical line X passes through both the inlet port 88B and the vent 78. The vertical line X in this example is parallel to a direction of gravity. Further, when viewed from above (such as from the perspective of the first plate 84), the inlet port 88B at least partially overlaps the vent 78. In this example, the inlet port 88B fully overlaps the vent 78. Specifically, the inlet port 88B is of a larger area than the vent 78 and the two are arranged such that when viewed in the direction of the line X from the perspective of the first plate 84, the area of the vent 78 is fully within the area of the inlet port 88B. The other inlet ports 88A, 88C and corresponding vents 78 are aligned in a similar manner. Further, while the second plate 86 does not contact the vents 78, the second plate 86 is spaced-apart vertically from the vents 78 by a relatively small distance D such that a vast majority of vent gas is directed into the vent gas passageway 82.

Figure 6:
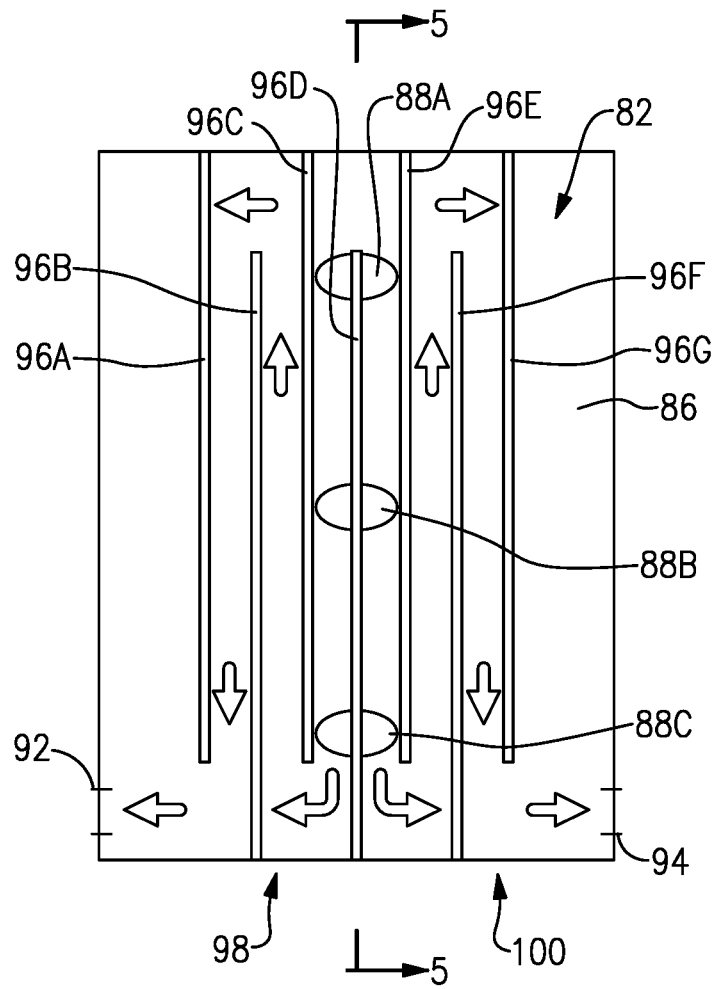
FIG. 6 is a sectional, top view of another portion of the battery assembly of FIG. 4 taken along line 6-6 from FIG. 5.

In this disclosure, with reference to FIG. 6, outlets 92, 94 of the vent gas passageway 82 are illustrated schematically. The outlets 92, 94 may be provided by one-way valves permitting egress but not ingress of fluid. The outlets 92, 94 may be formed in or adjacent the left and right side walls 64, 66, as examples. The outlets 92, 94 may be formed elsewhere, such as in the top wall 72 as an alternative to or in addition to the left and right side walls 64, 66.

One of the first and second plates 84, 86 may include projections extending between the plates to direct vent gas within the vent gas passageway 82. In an example, the first plate 84 includes a series of projections 96A-96G, as shown in FIG. 6. Each of the projections 96A-96G extends from the first plate 84 to the second plate 86. A central one of the projections, here central projection 96D, is arranged above and between the inlet ports 88A, 88B, 88C and serves as a divider directing vent gas to either a first section 98 of the vent gas passageway 82 or a second section 100 of the vent gas passageway 82. The projections 96A-96G could be provided by structures separate from the first and second plates 84, 86. Those separate structures can then be attached to the first and/or second plates 84, 86 by welding or brazing, as examples.

The projections 96A-96C and 96E-96G are staggered such that the first and sections 98, 100 each define a serpentine flow channel. Specifically, the first section 98 of the vent gas passageway 82 is a serpentine channel defined by the projections 96A-96C and leads from the inlet ports 88A-88C to the outlet 92. The second section 100 is a serpentine channel defined by the projections 96E-96G and leads from the inlet ports 88A-88C to the outlet 94. This disclosure is not limited to vent gas passageways with multiple sections or with serpentine flow channels. Rather, this disclosure extends to other circuitous passageways which provide an indirect route from an inlet to an outlet. A benefit of such a configuration is that, during a thermal event, as vent gases flow through the vent gas passageway 82, any debris, particles, or liquid droplets suspended in the vent gas tend to fall out of the gas and collect in the vent gas passageway 82, which prevents the discharge of such debris, particles, and/or liquid droplets into the electrified vehicle 12 and/or the surrounding environment.

In FIG. 5, a thermal event has occurred relative to the middle-most battery cell 58. As such, vent gas V has been released from the vent 78 and the vent gas V has caused the frangible section defining the inlet port 88B to at least partially separate from the remainder of the plate 86 such that the vent gas V enters the vent gas passageway 82. As vent gas V enters the vent gas passageway 82, it may impinge on the first plate 84. Further, any particles or droplets or other debris within the vent gas V will also impinge on the first plate 84. As generally discussed above, the material of the first plate 84 is selected of a relatively high strength material to protect the top wall 72. Downstream of the inlet port 88B, the vent gas V splits by interaction with the central projection 96D and is directed along one of the sections 98, 100 to a corresponding one of the outlets 92, 94. As the vent gas V flows along the vent gas passageway 82, any debris, particles, and/or droplets suspended the vent gas V fall out of the suspension and collect against the upper surface of the second plate 86. In this regard, the vent gas passageway 82 acts as a filter. Further, since vent gas V was directed into the vent gas passageway 82 as opposed to circulating within the interior 74, propagation of a thermal event is mitigated.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery assembly for an electrified vehicle, comprising:
   a battery array having a plurality of battery cells, wherein each of the battery cells includes a vent configured to release vent gas from a respective one of the battery cells;
   an enclosure assembly surrounding the battery array; and
   a vent gas passageway within the enclosure assembly, wherein the vent gas passageway includes a plurality of inlet ports, and wherein each of the inlet ports is substantially aligned with a respective one of the vents, wherein the inlet ports are provided by frangible sections of a structure, wherein the vent gas passageway is bound within a plate assembly arranged above the battery cells, wherein the plate assembly includes a first plate and a second plate, wherein the second plate is arranged between the first plate and the vents, and wherein the first plate is arranged adjacent a top wall of the enclosure assembly.

2. The battery assembly as recited in claim 1, wherein:
   the second plate provides the frangible sections, and
   each frangible section provides one of the inlet ports.

3. The battery assembly as recited in claim 2, wherein the second plate includes a plurality of notches providing each frangible section.

4. The battery assembly as recited in claim 2, wherein each frangible section is configured to at least partially separate from a remainder of the second plate in response to a thermal event.

5. The battery assembly as recited in claim 2, wherein:
the vents of the battery cells are adjacent an upper surface of the battery cells, and
the second plate is spaced-apart above the upper surfaces of the battery cells.

6. The battery assembly as recited in claim 1, wherein the vent gas passageway provides a circuitous passageway between the inlet ports and an outlet port of the vent gas passageway.

7. The battery assembly as recited in claim 6, wherein:
the vent gas passageway includes a first section and a second section, and
the vent gas passageway is configured such that vent gas entering the vent gas passageway from one or more of the inlet ports flows into either the first section or the second section.

8. The battery assembly as recited in claim 7, wherein a central divider within the vent gas passageway and adjacent the inlet ports directs vent gas entering the vent gas passageway from one or more of the inlet ports into one of the first and second sections.

9. The battery assembly as recited in claim 7, wherein the first and second sections are each configured as a serpentine flow channel.

10. The battery assembly as recited in claim 7, wherein the first and second sections are defined by projections between the first plate and the second plate.

11. The battery assembly as recited in claim 1, wherein the vents of the battery cells are configured to release the vent gas in a thermal event.

12. An electrified vehicle, comprising:
an electric machine configured to propel the electrified vehicle;
a battery assembly configured to deliver power to the electric machine, wherein the battery assembly includes a battery array having a plurality of battery cells, wherein each of the battery cells includes a vent configured to release vent gases from a respective one of the battery cells, wherein the battery assembly further includes an enclosure assembly surrounding the battery array, wherein the battery assembly further includes a vent gas passageway within the enclosure assembly, wherein the vent gas passageway includes plurality of inlet ports, wherein each of the inlet ports is substantially aligned with a respective one of the vents, and wherein each of the inlet ports is spaced-apart from the battery cells,
wherein the vent gas passageway is bound within a plate assembly arranged above the battery cells,
wherein the plate assembly includes a first plate and a second plate,
wherein the second plate is arranged between the first plate and the vents,
wherein the second plate includes a plurality of frangible sections,
wherein each frangible section provides one of the inlet ports,
wherein each frangible section is configured to at least partially separate from a remainder of the second plate in response to a thermal event, and
wherein the first plate is arranged adjacent a top wall of the enclosure assembly.

13. The electrified vehicle as recited in claim 12, wherein the vent gas passageway provides a circuitous passageway between the inlet ports and an outlet port of the vent gas passageway.

14. The electrified vehicle as recited in claim 13, wherein the circuitous passageway includes two serpentine flow channels.

15. A battery assembly for an electrified vehicle, comprising:
a battery array having a plurality of battery cells, wherein each of the battery cells includes a vent configured to release vent gas from a respective one of the battery cells;
an enclosure assembly surrounding the battery array; and
a vent gas passageway within the enclosure assembly, wherein the vent gas passageway includes a plurality of inlet ports, wherein each of the inlet ports is substantially aligned with a respective one of the vents, wherein the vent gas passageway is bound within a plate assembly, wherein the plate assembly includes a first plate and a second plate, wherein the inlet ports are provided by the second plate, wherein the vent gas passageway includes a first section and a second section, wherein a central projection extending between the first plate and the second plate and overlapping the inlet ports, when viewed from above, is configured as a divider such that the central projection directs vent gas entering the vent gas passageway from one or more of the inlet ports into either the first section or the second section.

16. The battery assembly as recited in claim 1, wherein the first plate is directly attached to the top wall of the enclosure assembly.

17. The battery assembly as recited in claim 8, wherein the central divider is provided by a central projection extending between the first plate and the second plate, wherein the central projection overlaps the inlet ports when viewed from above, and wherein the central projection is configured to direct vent gas entering the vent gas passageway from one or more of the inlet ports into either the first section or the second section.

18. The electrified vehicle as recited in claim 12, wherein the vent gas passageway includes a first section and a second section, and wherein a central projection extending between the first plate and the second plate and overlapping the inlet ports, when viewed from above, is configured as a divider such that the central projection directs vent gas entering the vent gas passageway from one or more of the inlet ports into either the first section or the second section.

19. The battery assembly as recited in claim 15, wherein the first plate is adjacent a top wall of the enclosure assembly.

* * * * *